(12) United States Patent
Hamilton

(10) Patent No.: US 8,267,035 B2
(45) Date of Patent: Sep. 18, 2012

(54) ROAD SAFETY DEVICE

(75) Inventor: Nicola May Hamilton, West Sussex (GB)

(73) Assignee: The Steer Clear Partnership LLP, Pulborough, West Sussex (GB)

( * ) Notice: Subject to any disclaimer, the term of this patent is extended or adjusted under 35 U.S.C. 154(b) by 35 days.

(21) Appl. No.: 12/599,929

(22) PCT Filed: May 9, 2008

(86) PCT No.: PCT/GB2008/001616
§ 371 (c)(1),
(2), (4) Date: Jan. 8, 2010

(87) PCT Pub. No.: WO2008/139165
PCT Pub. Date: Nov. 20, 2008

(65) Prior Publication Data
US 2010/0147208 A1    Jun. 17, 2010

(30) Foreign Application Priority Data
May 12, 2007 (GB) .................................. 0709307.3

(51) Int. Cl.
*B60Q 7/00* (2006.01)
*B60Q 1/30* (2006.01)

(52) U.S. Cl. ..................................... 116/28 R; 116/63 P

(58) Field of Classification Search ............... 116/28 R, 116/63 R, 63 P, 63 C, 63 T, 209, 278; 40/584, 40/588, 590–592, 603, 604, 903; 428/31, 428/99, 100, 102
See application file for complete search history.

(56) References Cited

U.S. PATENT DOCUMENTS

| | | | |
|---|---|---|---|
| 2,620,579 A | | 12/1952 | Dienes |
| 3,276,416 A | * | 10/1966 | Dirks et al. ................ 116/28 R |
| 3,334,554 A | * | 8/1967 | Adams ........................ 116/63 P |
| 3,594,938 A | * | 7/1971 | Mosch ............................ 40/591 |
| 3,701,210 A | * | 10/1972 | Smith ............................. 40/591 |
| 3,949,503 A | * | 4/1976 | Waress ........................... 40/591 |
| 4,021,948 A | | 5/1977 | Mosch |
| 4,534,619 A | * | 8/1985 | Bedford ...................... 359/519 |
| 4,601,538 A | * | 7/1986 | Valkenburg ................. 359/519 |
| 5,076,196 A | * | 12/1991 | Chan .......................... 116/28 R |
| 5,533,287 A | | 7/1996 | Cole |
| 5,893,226 A | * | 4/1999 | Sophocleous et al. ......... 40/591 |
| 5,975,599 A | * | 11/1999 | Goldstein ..................... 293/128 |
| 6,226,912 B1 | | 5/2001 | Tackett et al. |

(Continued)

FOREIGN PATENT DOCUMENTS
DE    1 803 503    5/1970
(Continued)

OTHER PUBLICATIONS

International Search Report for International Application No. PCT/GB2008/001616, European Patent Office, Rijswijk, Netherlands, mailed on Dec. 4, 2008.

*Primary Examiner* — R. A. Smith
(74) *Attorney, Agent, or Firm* — Sterne, Kessler, Goldstein & Fox P.L.L.C.

(57) ABSTRACT

An elasticated, high-visibility band is stretched over the rear boot of a car, providing a highly-visible X to alert other road users. The band is in the form of two connected loops or of one loop with two ties for attachment to the car.

18 Claims, 5 Drawing Sheets

U.S. PATENT DOCUMENTS

| | | | |
|---|---|---|---|
| 6,254,170 B1 * | 7/2001 | Farmer et al. | 296/136.07 |
| 6,415,734 B1 * | 7/2002 | LaPuzza | 116/201 |
| 6,708,433 B1 * | 3/2004 | Falkner et al. | 40/597 |
| 6,941,690 B2 * | 9/2005 | McCambley, Jr. | 40/591 |
| 2002/0104472 A1 * | 8/2002 | Neubert | 116/209 |
| 2002/0106481 A1 * | 8/2002 | Lin | 428/102 |
| 2004/0101656 A1 * | 5/2004 | Adams | 428/141 |
| 2007/0231067 A1 | 10/2007 | Roche et al. | |
| 2008/0040959 A1 * | 2/2008 | Schultz | 40/582 |

FOREIGN PATENT DOCUMENTS

| | | |
|---|---|---|
| DE | 1 941 403 | 2/1971 |
| DE | 202010001775 U1 * | 5/2010 |
| EP | 1 688 307 A2 | 8/2006 |
| FR | 2 349 475 | 11/1977 |
| JP | 2004161047 A * | 6/2004 |

* cited by examiner

ROAD SAFETY DEVICE

FIELD

The present invention relates to road safety apparatus and methods, in particular apparatus and methods for alerting drivers to a stationary vehicle, especially a stationary car, on the road.

BACKGROUND

Road safety devices, such as red triangles, to alert motorists to stationary vehicles are known. US2003196361 discloses a collapsible triangular warning sign that can be placed on the road at a distance in front of or behind a stationary vehicle to allow passing vehicles sufficient time and distance to take avoiding action. It is, however, necessary for these signs to be placed at some distance from the vehicle for optimum effectiveness. This requires the user to walk away from the vehicle in order to position the sign, often on a busy road and in poor visibility conditions. The user must also remember to recover the sign once the vehicle has been repaired or removed.

Some cars today include a red triangle in the boot which is visible when the boot is left open. The triangle is small compared to the car and is visible only when the boot is left open, which presents a security risk.

Other methods of alerting motorists to a stationary vehicle include using the hazard lights and/or side lights to signal the vehicle is immobile. However, these lights must be powered by the car battery and are therefore only usable for a finite period of time.

AIMS AND OBJECTS

It is an object of the present invention to provide road safety apparatus and methods to alert other motorists to a stationary vehicle on the road. It is an object of specific embodiments of the invention to provide a device that can be quickly and easily attached to a vehicle, especially to a car, to alert other motorists of its presence and that the vehicle is stationary. A further object is to provide a method of alerting motorists to a stationary vehicle.

SUMMARY OF INVENTION

Accordingly, the present invention provides a method of alerting road users to a vehicle, comprising attaching an elasticated, high-visibility sign across a portion of the side, front or rear of the vehicle. A method of alerting road users to a car comprises stretching an elasticated band over a portion of the rear of the car, wherein the band is made of or comprises high-visibility material so as to present one or more highly-visible lines across the rear of the car. In use, the sign or band preferably presents a highly visible X.

The invention additionally provides an elasticated band, made of or comprising high-visibility material which fits, when stretched, over a portion of the side, front or rear of a vehicle.

Using the band, a highly visible alert is easily attached to a vehicle, especially a car, so that other road users can see the vehicle and e.g. ensure they do not drive too close to it or that they take other avoiding/evasive action. The alert can be quickly attached and, referring to embodiments designed for cars, fits to most sizes and makes of car.

The method and band are of application generally to road vehicles, typically motorised ones. In different embodiments the method and band are adapted for use on road vehicles such as cars, vans, light goods vehicles, trucks, pick-up trucks, sports utility vehicles and lorries, though can also be used on non-motorised vehicles such as trailers, caravans and the like. The invention is in particular suited to smaller vehicles such as cars, vans, light goods vehicles and sports utility vehicles, and especially to cars.

In more detail, a preferred method of the invention comprises attaching the band to the rear of the vehicle, and preferred embodiments of the invention are for use on cars. The band is suitably attached so as to present an alert in the form of a cross to road users. An effective alert is a highly visible X.

The high visibility material can be of various types and many are known and in use on existing safety clothing or equipment. The band can for example comprise material which is brightly coloured or reflective or both brightly coloured and reflective. Other suitable material is fluorescent material and can be day-glo coloured, such as yellow, orange, white or red, or combinations of one or more of these colours. Other effective safety colours are also suitable. The band can additionally be made of or comprise material to which a reflective coating has been applied—either to the band or to a part of the band. In an example described in more detail below a device of the invention is made from a band which comprises a strip of brightly coloured material and a strip of reflective material. In a specific embodiment of the invention, the band comprises yellow fluorescent material with a red reflective strip.

A band of one embodiment of the invention comprises (i) at least one high-visibility portion which in use is visible to road users and (ii) at least one elastic portion which attaches the band to the vehicle. The band is for example in the form of a high-visibility X with four elasticated connectors, one extending from each arm of the X. The high-visibility X need not be elasticated, but can be. The connectors can be joined so as to form two connected loops or may have ends adapted to be attached to a vehicle, for example to attach inside a car door.

A band of a further embodiment of the invention is made of material which is both elasticated and also highly visible.

A still further band of the invention is in the form of a loop to which two arms are attached—the loop plus arms embodiments. The arms may be wholly or partially elasticated. Each arm can have a first end connected to the loop and a second, free end, or the free ends can be releasably connected to each other. Various forms of releasable connection are suitable for connecting the free ends of the arms. In a preferred embodiment of the invention, each free end comprises a strip of a hook and loop fastener e.g. Velcro®, allowing the ends to be joined to each other. An advantage of connecting the free ends of the arms using a hook and loop fastener, such as Velcro®, is that there is little to no risk of scratching the vehicle when fitting or removing the band.

A further option is that each free end has a connector for attachment to a vehicle, for example for attachment to a car window. In particular embodiments of the invention the free ends of the arms attach to hand grips or seat belts inside the vehicle via a connector which can be a hook.

Another band of the invention is in the form of two connected loops—the two loops embodiments. As will be appreciated, connecting the arms of the loop plus arms embodiment forms, substantially, a band of the two loops embodiments. These loops can be in a figure-of-eight and are suitably of approximately equal size.

In use of embodiments of the invention comprising a loop and two free ends, a method of attaching the band comprises stretching a loop of the band around a lower portion of the boot door of a car, closing the boot door and stretching the free ends of the band to respective left and right-hand sides of the car, and attaching the free ends to the car. The free ends can be attached to the car by a number of mechanisms, for example, by shutting the free ends in the rear doors or windows of the car or by tying the free ends to the grab handles. An alternative method of attaching the band comprises stretching a loop of the band around a lower portion of the boot door of a car, closing the boot door and stretching the free ends of the band to respective left and right-hand sides of the car, passing the free ends through respective left and right-hand windows of the car and attaching the free ends to each other. As will be appreciated, this method of fitting the band is more easily achieved when at least two people jointly fit the band to the vehicle.

A yet alternative method of attaching the band comprises stretching a loop of the band around a first portion (e.g. the top) of a door of a vehicle, stretching the free ends of the band to respective left and right-hand sides of the opposite portion (e.g. the bottom) of the door, passing the free ends around the inside of the door, attaching the free ends to each other and closing the door.

In use of a preferred embodiment of the invention comprising a loop and two free ends, a method of attaching the band comprises releasably connecting the two free ends of the band to form a band with two loops, stretching a first loop of the band around an upper portion of a door of a vehicle, stretching a second loop of the band around a lower portion of the door of the vehicle, and closing the door.

For bands with two loops, a method of attachment comprises stretching a first loop of the band around an upper portion of the boot door of a car, stretching a second loop of the band around a lower portion of the boot door of the car, and closing the boot door.

The band can be fitted to a single door or boot of a vehicle without inhibiting access to the vehicle. Provided that the band is fitted correctly, the door or boot will open, close and lock as usual.

Bands of the invention are of a range of sizes. The band is suitably from 2-15 cm wide, preferably from 3-10 cm wide and more preferably from 4-8 cm wide. A particular band, described in more detail below is about 5 cm wide. This has been used effectively to mark cars with a highly-visible cross. A particularly preferred band of the invention is about 8 cm wide.

The band length will vary according to its intended use. Particular embodiments have been made for use with cars and suitable lengths are found to be from 300-700 cm or 300-600 cm, preferably from 400-550 cm or 400-500 cm in length. One band used in an example is about 435 cm long and stretches to a maximum of about twice that length. A particularly preferred band of the invention is about 500 cm in length.

EXAMPLES

The invention is now described with reference to the accompanying drawings in which.

Figure 1:
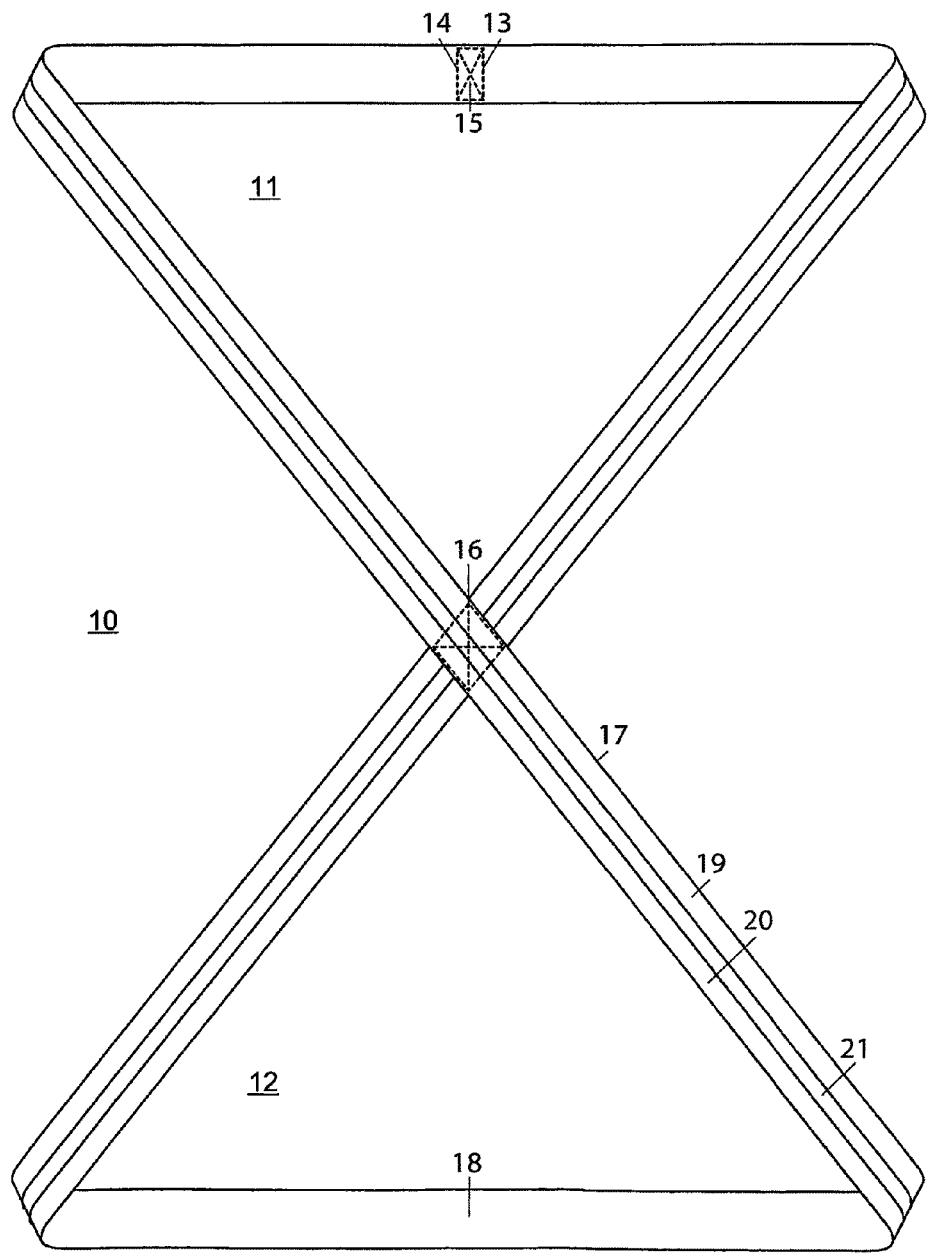
FIG. 1 shows a schematic front view of a band of a first embodiment of the invention.
Figure 3:
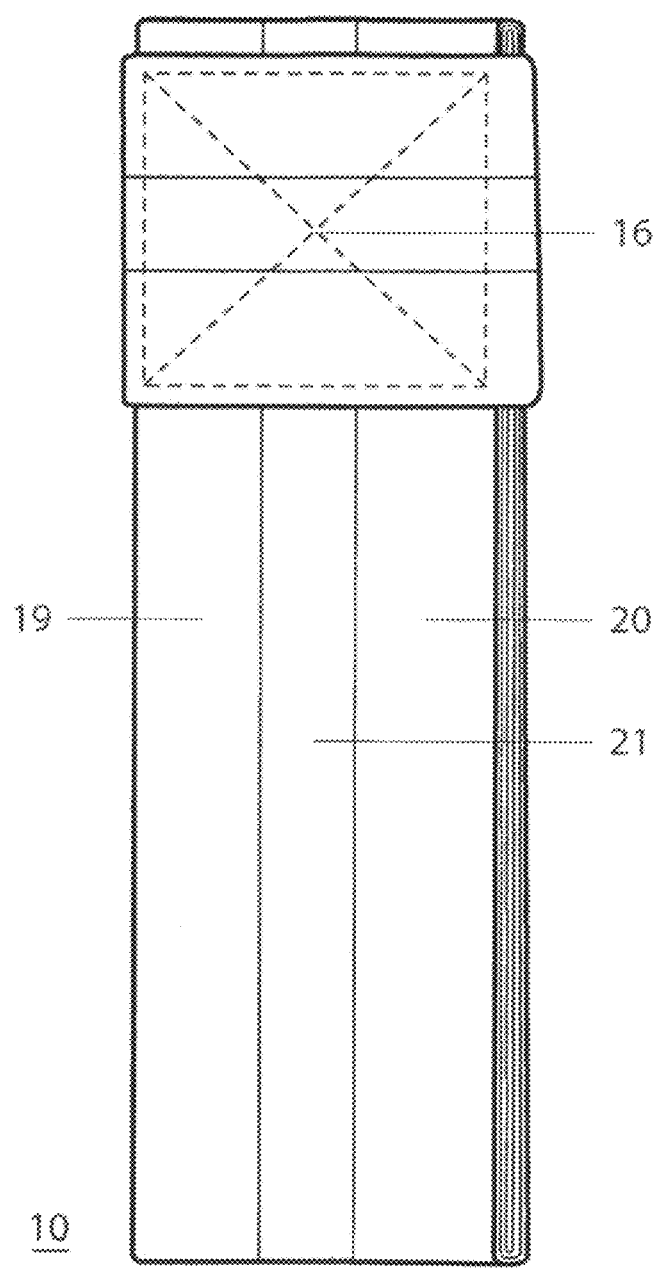
FIG. 3 shows a schematic front view of the band of FIG. 1 which has been folded.

Referring to FIGS. 1 and 3, a band (10) is made of elasticated material formed into loops (11 and 12). The band is made of a single piece of material with end (13) attached to end (14) at a joint (15). Stitching (16) holds the band in the two loops and forms the material into a figure-of-eight. The band is made by folding the material about its halfway point, forming a loop in the middle with two free ends. The loop is held in place by the stitching (16). The two free ends are then each twisted one half twist and attached to each other. The resultant band can then lie flat when stretched over the boot door of a car, as shown for example in FIG. 4. If the stitching is undone the band opens into a single large loop with one full 360° rotation in the material.

The band has front surface (17) and rear surface (18). The front surface (17) is divided into three strips, being bright yellow strips (19 and 20) separated by a central reflective strip (21).

The band is made from a 435 cm length of material with a 3 cm overlap where its ends (13 and 14) are joined. The band is elastic and can be stretched to approximately twice its starting length, returning to that length when the stretching is relaxed.

The band can be folded by holding the stitching (16) at the top, putting one loop inside the other, turning the stitching (16) 90 degrees and then folding each loop twice so that there are 16 layers of material. This folded band is approximately 25 cm long and fits conveniently inside a pouch or car door or elsewhere.

In use, the band is first unfolded. One loop is then stretched over the inside of the back of the boot so that the front surface (17) and the cross-shaped alert formed around the stitching (16) is on the outside of the boot door. The second loop is then stretched around a rear portion of the boot door. The boot can then be closed, holding the band in place and presenting a highly visible X to other road users.

Figure 2:
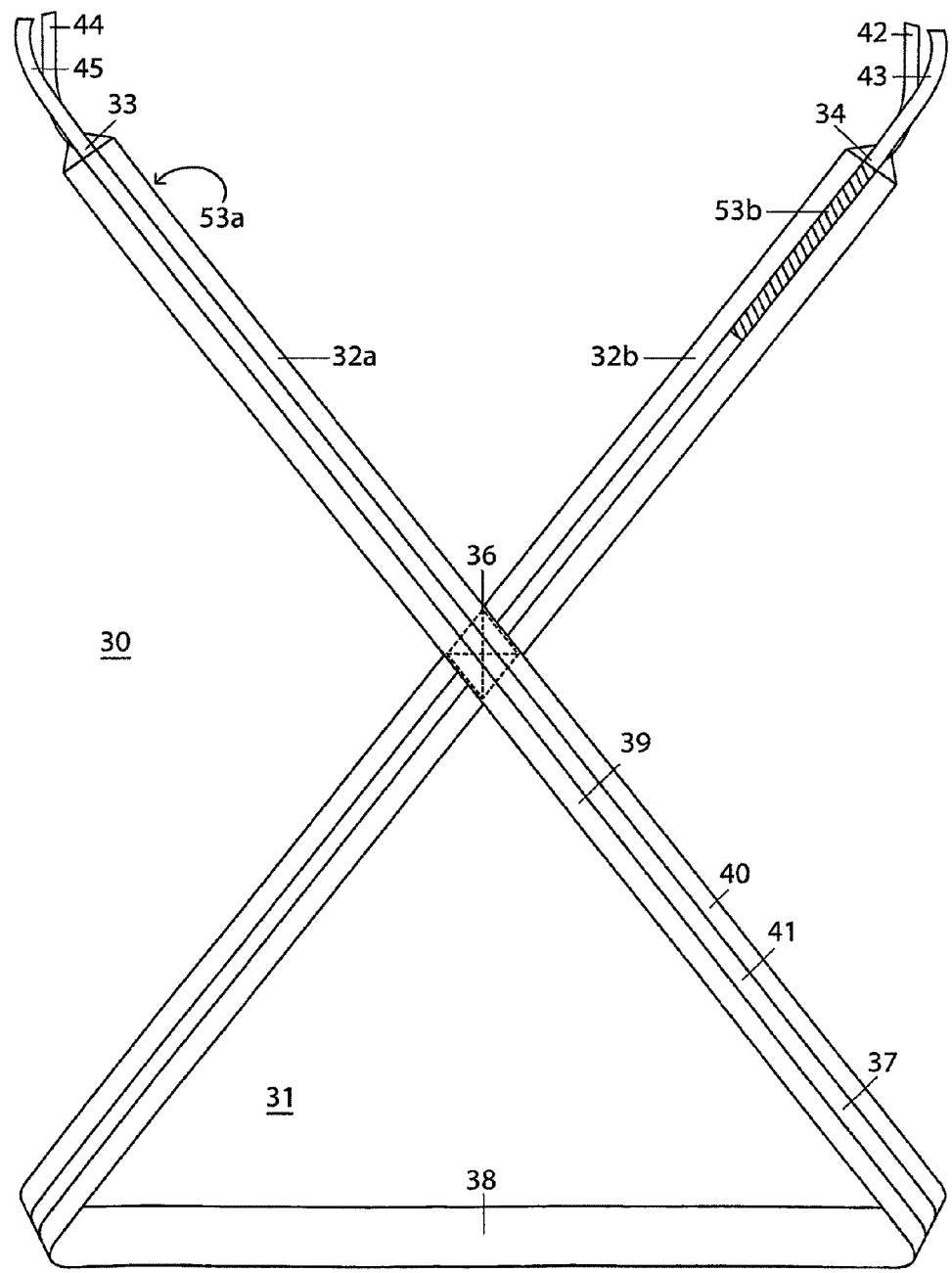
FIG. 2 shows a schematic front view of a band of a second embodiment of the invention.

Referring to FIG. 2, another embodiment of the invention is illustrated in which band (30) comprises a loop (31) and two free arms (32a and 32b), ending respectively in end portions (33 and 34). The band is formed into a loop (31) by the stitching (36). As for the first embodiment, the band has a front (37) and a back (38), with the front being divided into bright yellow strips (39 and 40) separated by a central reflective strip (41). The band is 435 cm in length and 5 cm wide. At the end portions (33 and 34) ties (44, 45 and 42, 43 respectively) are attached to the ends and can be used to tie or otherwise attach the end portions to the inside of a vehicle, especially to a car. Strips of hook and loop fastener e.g. Velcro® (53a and 53b) on the two free arms (32a and 32b) allow the fee arms to be releasably connected to each other. The end portions (33 and 34) may also be secured by being shut in the rear passenger doors of the vehicle.

In use of this band, the loop (31) is stretched around the lower portion of a car boot and the ends (33 and 34) then stretched one by one over the boot door and inside the car windows where they can be separately attached. Alternatively, the free arms (32a and 32b) are connected together, using the strips of hook and loop fastener (53a and 53b), to form a band with two loops, and which can be used in the same way as the band of FIG. 1. One loop can then be stretched over the inside of the back of the boot so that the front surface (37) and the cross-shaped alert formed around the stitching (36) are on the outside of the boot door, the second loop stretched around a rear portion of the boot door and the door closed. A highly visible X is presented to other road users.

Figure 4:
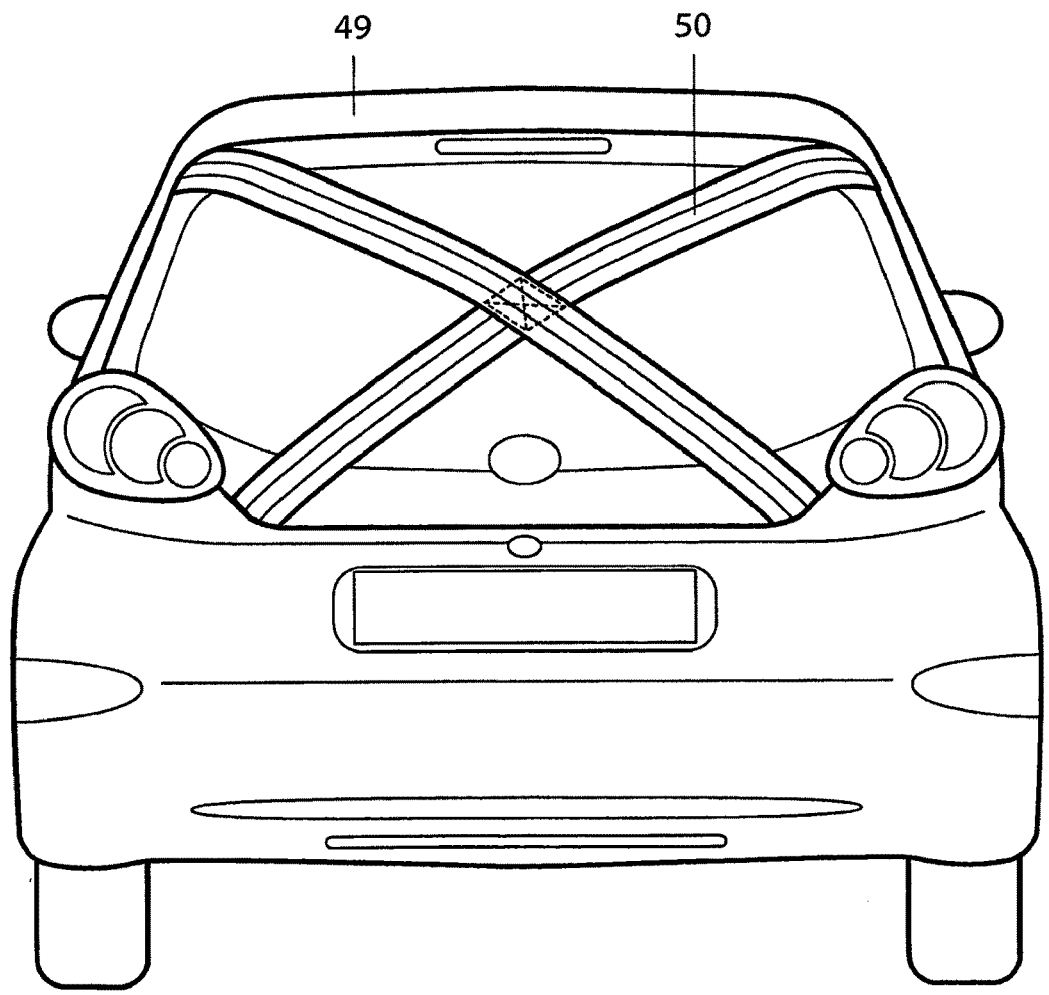
FIG. 4 shows a car to which the band of FIG. 1 has been attached.
Figure 5:
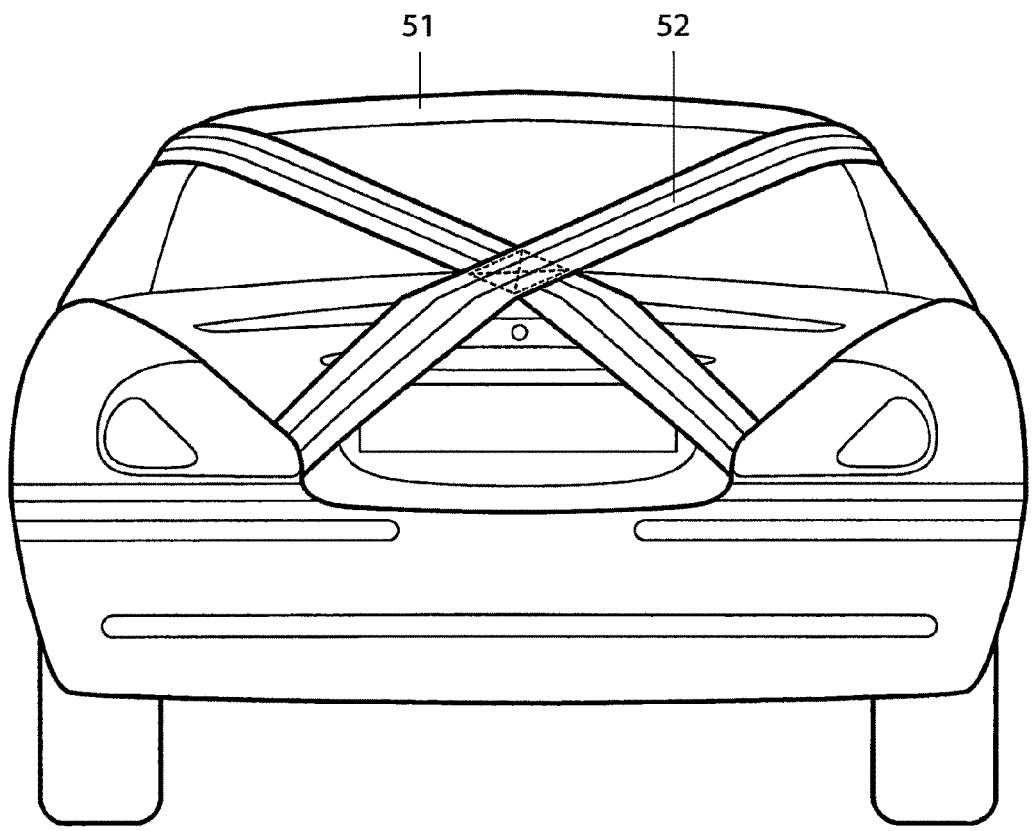
FIG. 5 shows a car to which a band of FIG. 2 has been attached.

Referring to FIGS. 4 and 5, these show embodiments of the invention in use. In FIG. 4, an alert is shown on car (49) by stretched band (50). This band is of the type shown in FIGS. 1 and 3.

In FIG. 5, a stretched band (52), of the type shown in FIG. 2, is stretched over car (51).

The invention thus provides road safety apparatus and use thereof.

The invention claimed is:

1. An elasticated band of from 300-600 cm in length and from 2-15 cm wide, made of a strip wherein at least one surface of the strip is brightly coloured or reflective or brightly coloured and reflective, wherein the band when stretched fits over and lies flat against a side, a front or a rear of a vehicle, wherein the band is in the form of a loop to which two arms are attached, and wherein the band comprises:
   (i) at least one high-visibility portion which in use is visible to road users in the form of a cross; and
   (ii) at least one elastic portion which attaches the band to the vehicle.

2. The band of claim 1, wherein the band is from 3-10 cm wide.

3. The band of claim 1, wherein the band is from 400-500 cm in length.

4. A method of alerting road users to a vehicle, comprising attaching an elasticated, high-visibility band in the form of a cross across a portion of a side, a front or a rear of the vehicle, wherein the band is in the form of two connected loops.

5. The method of claim 4, wherein the band comprises two loops in a figure-of-eight.

6. The method of claim 4, comprising stretching a first loop of the band around an upper portion of the boot door of a car, stretching a second loop of the band around a lower portion of the boot door of the car, and closing the boot door.

7. The method of claim 4, wherein the band comprises a strip of brightly coloured material and a strip of reflective material.

8. The method of claim 4, wherein the band is from 2-15 cm wide.

9. The method of claim 4, wherein the band is from 300-600 cm in length.

10. A method of alerting road users to a vehicle, comprising attaching an elasticated, high-visibility band in the form of a cross across a portion of a side, a front or a rear of the vehicle, wherein the band is in the form of a loop to which two arms, optionally wholly or partially elasticated, are attached, and wherein the method comprises stretching a loop of the band around a lower portion of the boot door of a car, closing the boot door and stretching free ends of the arms of the band to respective left and right-hand sides of the car, and attaching the free ends to the car.

11. The method of claim 10, wherein each arm has a first end connected to the loop and a second, free end.

12. The method of claim 11, wherein the free ends can be releasably connected to each other.

13. The method of claim 11, wherein each free end has a connector for attachment to a vehicle.

14. An elasticated band of from 300-600 cm in length, made of or comprising high-visibility material which fits, when stretched, over a portion of a side, a front or a rear of a vehicle, wherein the band is in the form of two connected loops and comprises:
   (i) at least one high-visibility portion which in use is visible to road users in the form of a cross; and
   (ii) at least one elastic portion which attaches the band to the vehicle.

15. The elasticated band of claim 14, wherein the band comprises a strip of material which is brightly coloured or reflective or brightly coloured and reflective.

16. The elasticated band of claim 14, wherein the band is from 2-15 cm wide.

17. The elasticated band of claim 14, wherein the band is from 3-10 cm wide.

18. The elasticated band of claim 14, wherein the band is from 400-500 cm in length.

* * * * *